No. 871,922.  
PATENTED NOV. 26, 1907.  
H. A. & J. P. FISHER.  
NUT LOCK.  
APPLICATION FILED NOV. 8, 1906.

Witnesses  
Inventors  
H. A. Fisher and  
J. P. Fisher  
By H. B. Willson & Co.  
Attorneys

UNITED STATES PATENT OFFICE.

HURFEY A. FISHER AND JAMES PERRY FISHER, OF CHARLESTON, WEST VIRGINIA, ASSIGNORS TO O. J. MORRISON, OF RIPLEY, WEST VIRGINIA.

NUT-LOCK.

No. 871,922.     Specification of Letters Patent.     Patented Nov. 26, 1907.

Application filed November 8, 1906. Serial No. 342,527.

*To all whom it may concern:*

Be it known that we, HURFEY A. FISHER and JAMES PERRY FISHER, citizens of the United States, residing at Charleston, in the county of Kanawha and State of West Virginia, have invented certain new and useful Improvements in Nut-Locks; and we do declare the following to be a full, clear, and exact description of the invention, such as will enable others skilled in the art to which it appertains to make and use the same.

Our invention relates to improvements in nut locks, and it consists in the construction, combination and arrangement of devices hereinafter described and claimed.

Figure 1:
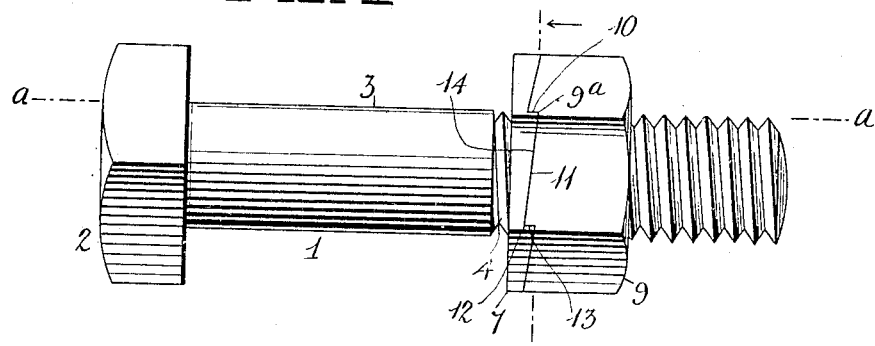
Figure 2:
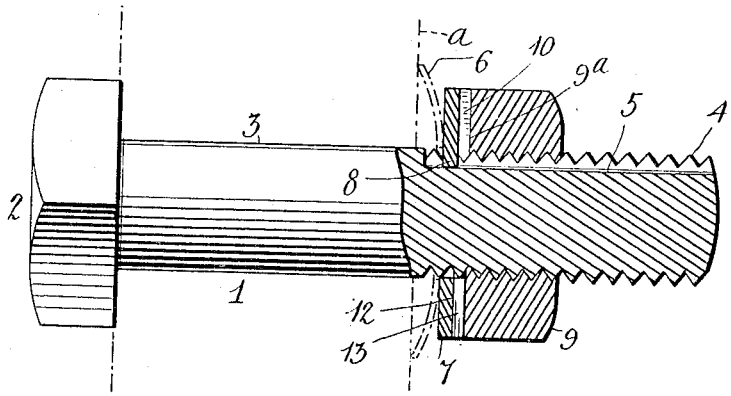
Figure 3:
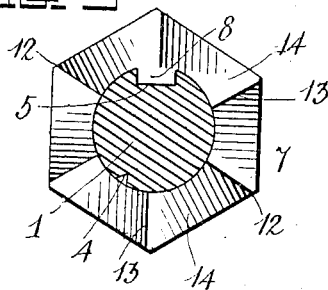

In the accompanying drawings:—Figure 1 is an elevation of a nut lock embodying our invention; Fig. 2 is a longitudinal sectional view of the same, taken on the plane indicated by the line $a$—$a$ of Fig. 1; and Fig. 3 is a transverse sectional view of the same.

The bolt 1 has the usual head 2, shank 3, screw threaded outer end 4, and is further provided with a longitudinal groove or channel 5, which intersects said screw threads. A cup-shaped or concavo-convex spring washer 6 is placed on the bolt to bear against the object in which the bolt is used, and which is here indicated in dotted lines at $a$. A locking washer 7 is then placed on the bolt and is provided with a locking tongue 8, which enters and is adapted to travel longitudinally in the groove 5. The nut 9, which bears against the washer 7, is provided on its inner side with locking teeth 9, which present radial shoulders 10 and inclined surfaces 11, said inclined surfaces of the respective locking teeth extending all in one direction. The washer 7 is provided in its outer side with similar teeth 12, which present radial shoulders 13 and inclined surfaces 14, said surfaces being parallel with those of the nut. Owing to the teeth 9 and 12 corresponding in form, the meeting faces of the nut and washer will lie in flush contact throughout the entire area of said faces when the parts are in locking position.

It will be understood that when the nut is screwed in on the bolt, so as to bear against the washer 7, its teeth engage those of the washer and coact therewith to prevent the nut from being unscrewed, the washer 7 being locked to the bolt by means of the tongue 8 which engages the groove 5 in the bolt. The pressure of the spring washer 6 between the bolted object and the washer 7 also serves to keep the teeth of said washer 7 in engagement with those of the nut, as will be understood.

It is to be noted that the concave face of the spring washer is disposed toward the bolted object against which the marginal edge of the washer bears, and that the outer convex face of the spring washer has bearing at all points in a line concentric with the axis of the bolt upon the adjacent face of the locking washer for pressing the latter evenly to locking position, the spring washer being adapted to yield to permit positive movement of the locking washer to bolt-releasing position.

It may be mentioned that owing to the locking washer being pressed evenly into contact with the toothed face of the nut under the action of the spring washer, the entrance of dust and other foreign matter between the faces of the locking washer and nut is prevented.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described our invention, what we claim as new and desire to secure by Letters-Patent, is:—

In a nut lock, a bolt having a threaded portion provided with a longitudinal groove, a yieldable spring metal washer of concavo-convex form in cross section loosely applied on the bolt with its concaved face disposed toward and to bear at its marginal edge directly against the bolted object, a locking washer arranged on the bolt to bear at its inner side face immediately against the convex face of the spring washer, said locking washer having a tongue engaged in said groove and being provided on its outer side face with a series of radial locking teeth having radial shoulders and intervening inclined surfaces, and a nut threaded onto the bolt and having on its inner side face radial locking teeth corresponding to and for coöperative interlocking engagement with those on the locking washer, adapting the meeting faces of the nut and locking washer to lie in flush contact throughout the entire area of said faces when the parts are in locked position, the spring washer having bearing at all points, in a line concentric with the axis of the bolt upon the adjacent face of the locking washer for pressing the latter evenly to locking position and being adapted to yield to permit positive movement of the locking washer to bolt-releasing position.

In testimony whereof we have hereunto set our hand in presence of two subscribing witnesses.

HURFEY A. FISHER.
    JAMES PERRY FISHER.

Witnesses:
 W. A. DORSEY,
 R. H. FISHER.